United States Patent

Lawrence et al.

[15] 3,688,285

[45] Aug. 29, 1972

[54] FLEXIBLE DISK MAGNETIC RECORDING DEVICE

[72] Inventors: George Lawrence, Ossining; Hans J. Mueller, Mohegan Lake, both of N.Y.

[73] Assignee: International Business Machines Corporation, Armonk, N.Y.

[22] Filed: Feb. 16, 1970

[21] Appl. No.: 11,498

[52] U.S. Cl.........................340/174.1 E, 179/100.2 P
[51] Int. Cl................................................G11b 5/60
[58] Field of Search.179/100.2 CA, 100.2 P, 100.2T; 340/174.1 E

[56] References Cited

UNITED STATES PATENTS 2,950,353 8/1960 Fomenko............179/100.2 P
3,319,015 5/1967 Eccarius et al......179/100.2 T

FOREIGN PATENTS OR APPLICATIONS 1,119,186 4/1956 France................179/100.2 P
651,719 2/1965 Belgium..............179/100.2 P

*Primary Examiner*—J. Russell Goudeau
*Attorney*—Hanifin and Jancin and John A. Jordan

[57] ABSTRACT

A flexible magnetic storage disk is stably rotated over a backer plate on a thin film of air entering between disk and plate, at a point interior with respect to the disk periphery, to thereby form the disk into a surface of revolution. A read-write transducer head protrudes into the surface of revolution to provide microinch separation between disk and head.

5 Claims, 4 Drawing Figures

INVENTORS
GEORGE LAWRENCE
HANS J. MUELLER

BY John A Jordan
ATTORNEY

FLEXIBLE DISK MAGNETIC RECORDING DEVICE

Background of the Invention

The present invention relates to magnetic storage devices and more particularly to non-contact flexible disk magnetic storage devices.

One of the major problems confronting widespread application of the principles of flexible disk magnetic recording has been the inability to effectively achieve and maintain a narrow separation between the pliant disk and the transducer head without contact therebetween. Various efforts have been mad to solve this problem with less than satisfactory results.

The narrow head-to-disk separation requirements of flexible disk magnetic recording extends to both digital and analog recording. For flexible disk magnetic recording to provide an effective medium for digital recording high density bit storage and therefore narrow spacing is required. For effective analog storage, particularly for high frequency signals as required, for example, in video buffering, reasonable signal-to-noise ratios must be achieved and maintained.

Since db signal loss is approximately equal to $55d/\lambda$, where dis the head to disk distance or separation and $\lambda$ is the physical length of the recorded wave, it is clear that the signal-to-noise ratio improves with reduction of separation.

One approach to the problem of maintaining a narrow separation is to position air nozzles or the like in the vicinity of the transducer head and by controlling the jets of air from the nozzles thereby control the disk-to-head separation. Such an approach is described in U.S. Pat No. 3,405,405 to Boissevain et al., filed Aug. 11, 1965. One of the difficulties with this as well as other approaches to the problem lies in the fact that they suffer from an inability to simply and accurately maintain a sufficiently narrow separation for effective results.

Summary of the Invention

In accordance with the principles of the present invention an extremely narrow head-to-disk separation, of the order of 10 to 30 microinches, is achieved and accurately maintained by protruding the head from the base plate through the primary air bearing into the rotational plane of the disk to thereby create a secondary air bearing to effect the narrow separation.

Accordingly, it is an object of this invention to provide an improved non-contact flexible disk magnetic recording device.

It is a further object of this invention to provide an improved flexible disk magnetic recording device capable of providing very narrow transducer head-to-disk separation.

It is still a further object of this invention to provide a flexible disk magnetic recording device capable of effectively providing high density bit storage and high frequency analog storage.

It is yet another object of this invention to provide a flexible disk magnetic recording device capable of effectively providing high density bit storage and high frequency analog storage.

It is yet another object of this invention to provide a flexible disk magnetic storage device having a transducer head mounted to extend into the rotational plane of the disk to create a secondary air bearing between head and disk to thereby provide a steady-state narrow-separation condition.

The foregoing and other objects, features and advantages of the invention will be apparent from the following more particular description of a preferred embodiment of the invention, as illustrated in the accompanying drawings.

Description of the Preferred Embodiment

Figure 1:
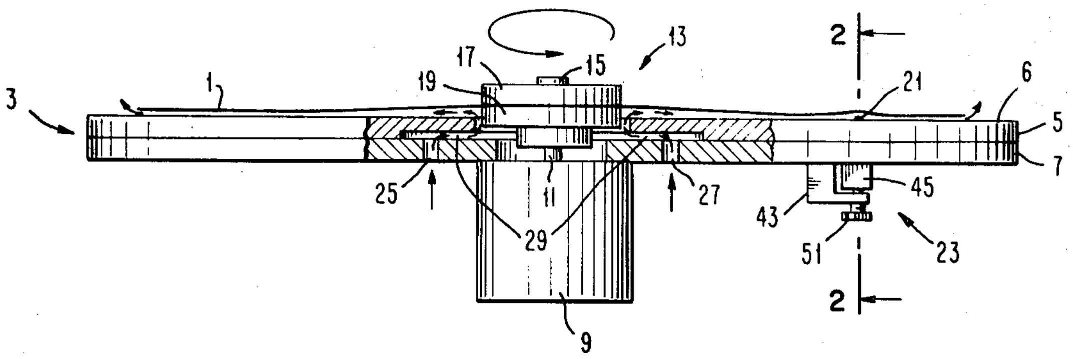
FIG. 1 shows an elevation view, partially in section, if a preferred embodiment of a recording device employing the principles of the present invention.

The arrangement of FIG. 1 shows a preferred embodiment of the flexible disk magnetic recording device employing the principles of the present invention. As shown in FIG. 1 a flexible or pliant magnetic recording disk 1 is shown rotating over base plate 3 comprising backer plate 5 juxtaposed with support plate 7. Motor 9 is used to rotate the disk via shaft 11 and hub 13. The flexible recording disk 1 is centrally held in position, with respect to shaft 11, by hub 13. Bolt 15 is used to firmly clamp the upper section 17 of hub 15 to lower section 19 thereby firmly holding disk 1 at its centrally positioned location.

Read-write transducer head 21 is shown in FIG. 1, in accordance with the principles of the present invention, protruding above backer plate 5 into the rotating plane of disk 1. Beneath base plate 3 is shown transducer head mounting apparatus 23 used to adjust the angle and protrusion of transducer head 21, as will be explained more fully hereinafter with reference to FIGS. 2 and 3. It is clear that any number of transducer heads may be positioned into base plate 3 in a manner akin to head 21 in accordance with needs of a particular application. For example, for video buffering two transducer heads may be employed with each head defining a different recording track wherein one field of the video signal may be recorded in one track and the other field of the video signal recorded in the other track so that one full frame, equaling two fields, is recorded per revolution. Alternatively, one head and track may be employed with each field of the video signal being recorded on 180° of the track. In such an arrangement, the stored frames may, for example, be continuously read back by the transducer heads for display refresh of a video display device.

Likewise, in digital applications any of a variety of transducer head arrangements may be employed. For example, several heads positioned to define the same number of concentric recording tracks may be employed. Alternatively, radial slots may be positioned in the base plate 3 whereby radial addressing means could be employed to automatically adjust the radius of a single head to conform with the location of any one of several tracks for reading or writing data.

It is to be understood that any of a variety of flexible magnetic recording medium may be employed to fabricate the disk used in the present invention. For example, a 1 mil thick sheet of Mylar with approximately 200$\mu$ inches of magnetic coating may be employed to fabricate the disk. It is clear that it is also possible to have the central portion of the disk relatively rigid with the outer portion limp and pliable.

In operation, when motor 9 is de-energized, the outer portion of normally limp disk 1 rests upon the upper surface 6 of plate 5, which surface is smooth. However, when motor 9 is energized for rotation of shaft 11, disk 1, since its central section is clamped to hub 13, is constrained to rotate with the shaft. The rotational velocity is sufficiently high so that centrifugal forces cause the outer portion of disk 1 to lift from the surface 6 of plate 5 to form a steady state surface of revolution rotating on a thin film of air between disk 1 and the surface 6. As shown by the arrows in FIG. 1 the rotation of disk 1 causes air to be drawn up through the shown air entrance orifices 25 and 27 into channel 29 and out between plate 5 and disk 1. It is clear that although only two orifices are shown in the partial section, several orifices in plate 7, displaced in like manner around motor 9, may be employed. It is also clear that any of a variety of arrangements may be used for admitting air or the like into the region between disk 1 and surface 6 at a position interior with respect to the disk periphery. Thus, for example, air or the like may be admitted through disk orifices from the region above disk 1 as taught in Pat. No. 3,573,771 to H. Cockrell, Jr., issued Apr. 6, 1971 and assigned to the assignee of the present invention.

In accordance with one explanation, when centrifugal forces act to raise the disk, air in contact with he disk surface is frictionally engaged by the disk and swept around with the disk. The resultant centrifugal forces acting upon the air particles cause the engaged air to be outwardly pumped between disk 1 and plate 5. Since the outwardly pumped air has a substantial velocity, then, in accordance with Bernoulli's principle, the pressure between disk 1 and plate 5 is reduced thus causing a further reduction in separation between disk 1 and plate 5 until an equilibrium or steady state condition is reached wherein the Bernoulli forces are balanced by opposing forces, such as, the disk internal and centrifugal stress forces and the forces effected by the moving air bearing in pushing apart disk and plate. For further treatment of the operation of flexible disk magnetic recording reference is made to the U.S. Pat. No. 2,950,353 to Fomenko, filed July 5, 1955 and to Proceedings of the IRE Jan. 1961, "The Development of the Flexible-Disk Magnetic Recorder" by R. T. Pearson, pages 164–165.

Thus, when equilibrium attains as described above, a narrow constant separation, in the order of mils, is maintained between disk 1 and plate 5, with the separation generally being smallest in in the area of the disk out away from the vicinity of hub 3. This can be seen in FIG. 1 wherein disk 1 is first shown sloping downwardly from hub 13, which may hold the center of the disk of the order of 10 mils from the upper surface 6 of plate 5, and then is shown leveling off in a region exhibiting a relatively thin and uniform film of moving air beneath the disk. Such a film of air has been characterized as an air bearing which air bearing may provide separation of the order of a few mils.

Figure 2:
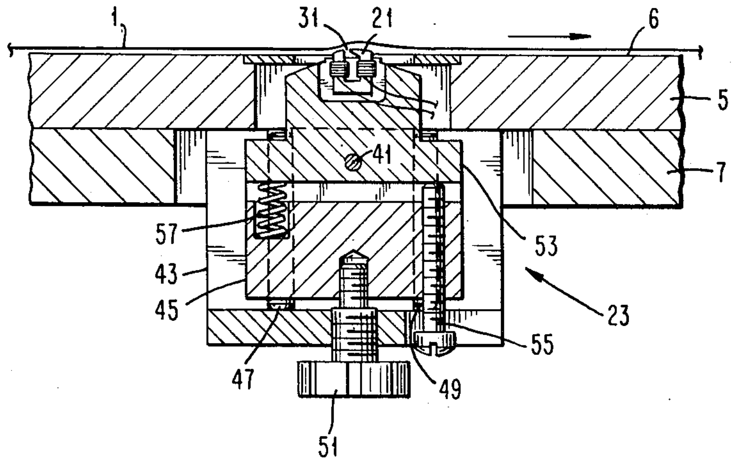
FIG. 2 shows a detailed sectional view, taken along line 2—3 of FIG. 1, of the adjustable transducer head mounting apparatus of FIG. 1, which apparatus is exemplary of those that may be employed in carrying out the principles of the present invention.

As hereinabove indicated an important aspect of effective utilization of flexible disk magnetic recording resides in the ability to achieve very narrow separations between the recording disk and transducer head. In the arrangement thus far described narrow constant separation of the order of tenths of mils may be obtained between the disk and transducer head where the head is flush with surface 6 of plate 5 or protrudes slightly beyond surface 6 into the primary air bearing. However, such separations are not sufficiently small for effective use in most applications and, in accordance with the principles of the present invention, separations of the order of microinches are achieved by protruding the transducer head beyond the primary air bearing and into the rotating plane of the recording disk so as to produce a secondary air bearing between the transducer head surface and the surface of the flexible disk. Such an arrangement is generally shown in FIG. 1 wherein transducer head 21 extends into the stabilized rotational plane of disk 1. The manner in which transducer head 21 may be adjusted into the rotational plane of disk 1 is shown in FIG. 2 the details of which will be explained more fully hereinafter.

Figure 3:
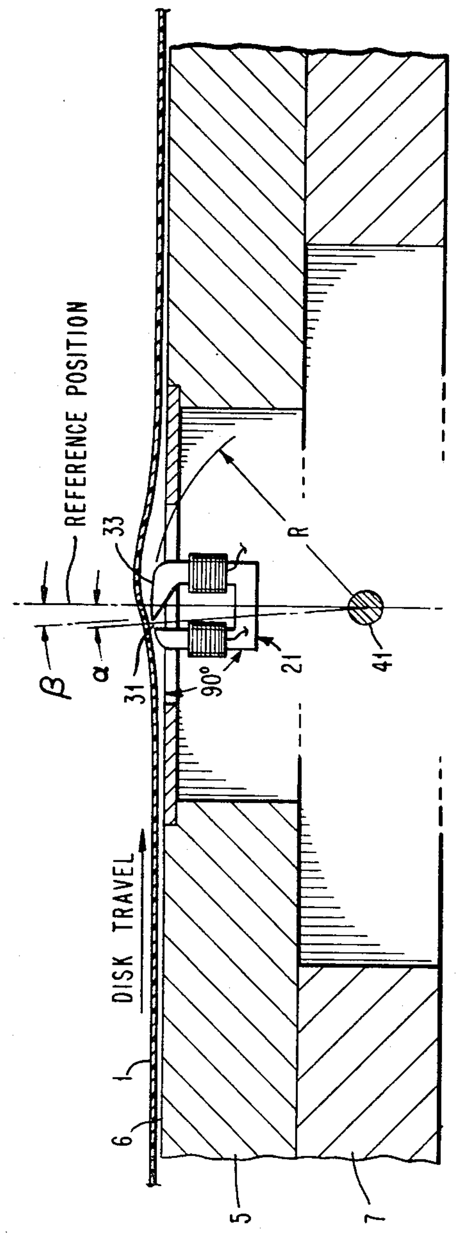
FIG. 3 shows an enlarged fragmentary view of a partial section of the recording device of FIG. 1 taken along line 2—2 such as to show the relationship between transducer head and flexible recording disk.
Figure 4:
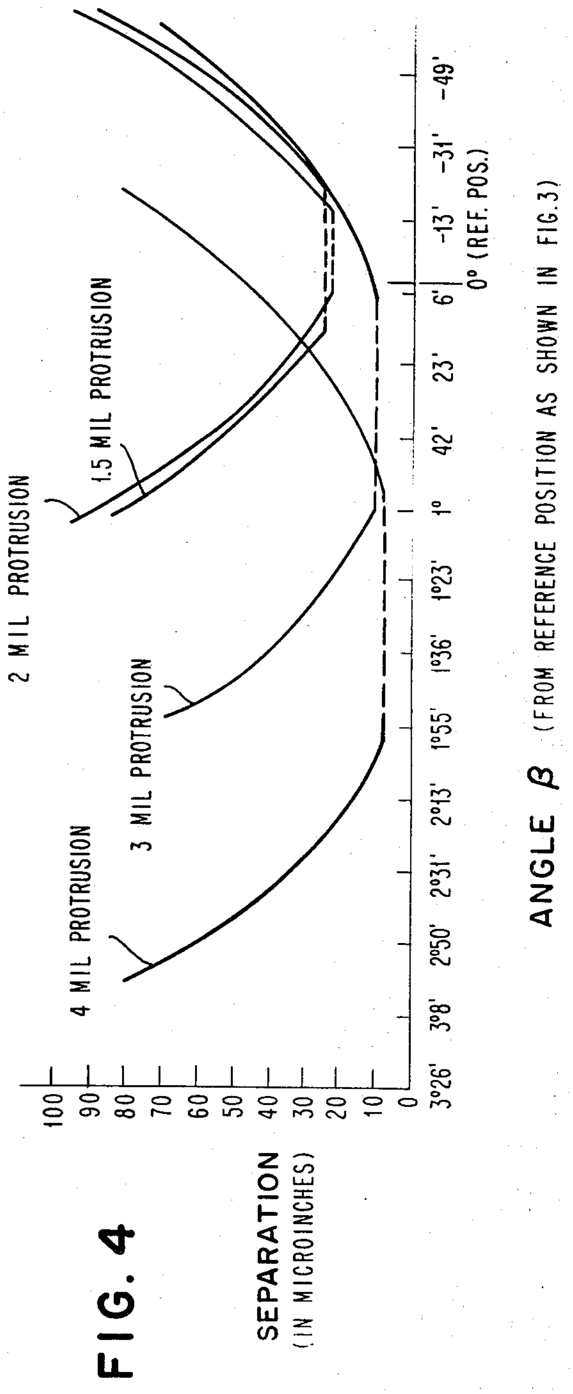
FIG. 4 shows a plot of head-to-disk separation as a function position along the surface of the transducer head, as measured by angle $\beta$ from a reference position, for various head protrusions.

With reference to FIG. 3 there is shown an enlarged view of the relationship between head 21 and disk 1. It should be understood, however, that this enlarged view is not an attempt to provide a scaled version but merely a depiction, with certain features exaggerated, to aid in the description of the key functional interrelationships involved in the operation of the storage device in accordance with the principles of the present invention. As is clear from this view head 21 is arranged to protrude into the plane of rotating disk 1 to provide a stabilized microinch separation caused by the creation of a secondary air bearing between surface 33 of head 21 and the recording surface of disk 1. However, as can be seen the separation is not uniform over the entire surface 33 of head 21, the more narrow separation occurring, in general, on the disk approach side of the head in the vicinity of head gap 31. Examples of more specifically defined regions of minimum separation, characterized in terms of location on the surface 33 of transducer head 21 for various head protrusions, are shown in FIG. 4.

The significant aspect of obtaining microinch separation, as taught by the present invention, resides in the protrusion of the transducer head through the primary air bearing into the stabilized rotational plane of the disk. As shown in FIG. 3 the primary air bearing, existing between the surface 6 of plate 5 and disk 1, may, for example, be of the order of 0.5 to 1.5 mils while the protrusion of head 21, as measured from the high point on its surface 33 in a position normal to surface 6 of plate 5, may, for example, be of the order of from 1.5 to 4 mils. It is clear that the upper extent of protrusion into the rotational plane of disk 1 is limited by deterioration of the secondary air bearing wherein disk 1 comes into contact with head 21. Thus, the upper range of protrusion of head 21 is a function of, among other parameters, the tensil strength of the flexible disk, which is a function, in part at least, of the disk thickness, the speed of rotation of the disk, the smoothness of the transducer head surface, and the regularity and the overall smoothness of the disk surface. It is clear that this latter factor, i.e., smoothness of the disk surface, is dependent to a great extent upon the nature and characteristics of magnetic material coating the flexible medium. Although these factors, in themselves, are not critical they do act to effect an upper limit of protrusion.

With reference to FIG. 3, it should be noted that the radius of curvature of the head surface 33 can be made to correspond to R, the center of which acts as a pivotal point for adjusting the angular position of the head. This can be seen in FIG. 2 wherein shaft 41 provides an axis for rotational adjustment of head 21. In accordance with such an arrangement rotational adjustment of head 21, and therefore gap 31, will not change the extent of protrusion of the head, as measured from its high-point, but merely the position of gap 31. In this respect it should be noted that any of a variety of head configurations may be employed. For example, rather than the head 21 arrangement shown wherein gap 31 is off-set from the axis of symmetry of the head, a head arrangement may be employed wherein the gap is located on the axis of symmetry.

In accordance with the principles of the present invention it has been found that the location of regions of minimum separation between disk 1 and head 21 in FIG. 3 varies as a function of head protrusion into the rotational plane of the disk. Regions of minimum separation may be defined as areas of the secondary air bearing which exhibit as relatively constant film of air. Thus, with reference to FIG. 3, as head 21 is incrementally increased in protrusion, the location of regions of minimum separation between disk 1 and head 21 move in increments over head surface 33, with respect to a reference position, in a counterclockwise direction. For purposes of explanation the reference position may be taken as the high point on surface 33 when head 21 is in a position orthogonal to surface 6. This high point reference position corresponds to the center line of head 21, as shown in FIG. 3. Angle $\alpha$, as shown therein, defines the angle between gap 31 and this high point reference position on surface 33 when head 21 is orthogonal. Angle $\beta$ defines, in general, angular locations on surface 33 with respect to the reference position when the head 21 is orthogonal.

With reference to FIG. 4 there is shown plots of separation between disk 1 and head 21 as a function of $\beta$, as shown in FIG. 3, for various head protrusions in an arrangement employing a 1 mil thick aluminized Mylar disk having a diameter of 10 inches and rotated at 3,600 rpm to move past the head at 1,520 inches/sec. Such an arrangement is given merely by way of example to demonstrate the phenomena of the microinch separation and the manner in which to achieve minimum microinch separation between disk and head gap in accordance with the principles of the present invention. It should be recognized that disks having different thicknesses, diameters and coatings and rotated at different speeds would produce different plots.

It can be seen with reference to FIG. 4 that the plots of the larger protrusions exhibit regions of minimum separation (the dashed portions of the plots) in the vicinity of the larger angles of $\beta$, when $\beta=0$ corresponding to the reference position itself as shown about three quarters of the way down the angle $\beta$ scale. Thus, as the head protrudes further, the regions of minimum separation move upstream on the head surface. Likewise, it can be seen that with increasing protrusions, regions of minimum separation decrease. Thus, in this example a 4 mil protrusion will provide a slightly greater than 10 microinch separation in the vicinity of $\beta$ between 1° and 1°55′. Protrusions approaching 4.5 mils in this example have been found to cause the secondary air bearing film to deteriorate. Thus an optimum protrusion would be around 4 mils in this example and the location of minimum separation for such protrustion would be in the vicinity of $\beta$ greater than 1 and less than 2°, as shown in FIG. 4. With reference to FIG. 3 it can be seen that for such an optimum protrusion gap 31 can be adjusted to correspond in position to the region of minimum separation, by clockwise rotation of head 21. Thus, where $\Delta$ is approximately equal to 3.5°, for example, rotating head 21 approximately 2° would put gap 31 within the central portion of the region of minimum separation for this 4 mil optimum protrusion, as defined in FIG. 4.

Apparatus, exemplary of those that may be employed for adjusting head 21 are shown in FIG. 2. Mounting apparatus 23 comprises fixed support member 43 which is mounted to the bottom of plate 5. Movable mounting member 45 is arranged to slide vertically on tracks 47 and 49 in response to rotation of differential lead screw 51. In addition, spring- loaded rotatably movable housing 53 is arranged to pivot on shaft 41 in response to rotation of lead screw 55 with spring 57 providing the stabilizing return force. Thus, it can be seen that the protrusion of transducer head 21 above surface 6 is adjusted by rotation of lead screw 51 while the angular position of gap 31 is adjusted by rotation of lead screw 55.

What is claimed is:

1. In a flexible disk magnetic storage device including, a flexible magnetic storage disk, backer plate means to stabilize said disk, means to rotate said disk to form a surface of revolution stably supported on a first thin film of fluid between said backer plate means and said disk, the improvement comprising:

read-write transducer means including a read-write gap and first and second adjustable means to allow at least first and second degrees of adjustment of said transducer means, said first adjustable means comprising vertical adjusting means to adjust said transducer means so that the high point on said transducer means extends from said backer plate a distance between approximately 1.5 and 4 mils so as to protrude from said backer plate through said first thin film of fluid a distance greater than the distance between said backer plate and said disk undisturbed on said first thin film of fluid so as to stably form between said transducer means and said disk a second thin film of fluid thinner than said first thin film of fluid, and said second adjustable means comprising rotational adjusting means to rotate said transducer means so that said read-write gap is rotationally displaced from said vertical between 0° and 2° in opposition to the direction of rotation of said disk so as to position said gap within a region of minimum separation between said gap and said disk in accordance with the extent of said protrusion.

2. The device as set forth in claim 1 wherein said fluid is air.

3. In a non-contact magnetic recording device including, a pliant record disk having a magnetizable surface, at least the outer portion of said disk having small internal stresses thereby being normally limp and pliable, means to rotate said pliant record disk at a preselected velocity and backer plate means mounted to stabilize rotation of said disk by forming said disk into a surface of revolution which rotates on a thin film of air entering between said backer plate and said disk with each element of at least the outer periphery of said portion substantially lying in a common plane of rotation, said improvement comprising:

read-write transducer means including a read-write gap and first and second adjustable means to allow at least first and second degrees of adjustment of said transducer means, said first adjustable means comprising vertical adjusting means to adjust said transducer means so that the high point on said transducer means extends from said backer plate means a distance between approximately 1.5 and 4 mils so as to protrude through said thin film of air a distance greater than the distance between said backer plate means and the said magnetizable surface of said disk undisturbed on said thin film of air to thereby stably establish a micro-inch separation between the said magnetizable surface of said disk and said transducer means for reading and writing information, and said second adjustable means comprising rotational adjusting means to rotate said transducer means so that said read-write gap is rotationally displaced from said vertical between 0° and 2° in opposition to the direction of rotation of said disk so as to thereby position said into a region of minimum separation between said gap and said disk, in accordance with the extent of said protrusion.

4. The device as set forth in claim 3 wherein said thin film of air enters between said backer plate and said disk via orifice means in said disk.

5. The device as set forth in claim 3 wherein said thin film of air enters between said backer plate and said disk via orifice means in said backer plate means.

* * * * *